(No Model.)
G. G. LEE.
FIELD ROLLER AND SEED AND PLASTER SOWER.
No. 249,957. Patented Nov. 22, 1881.
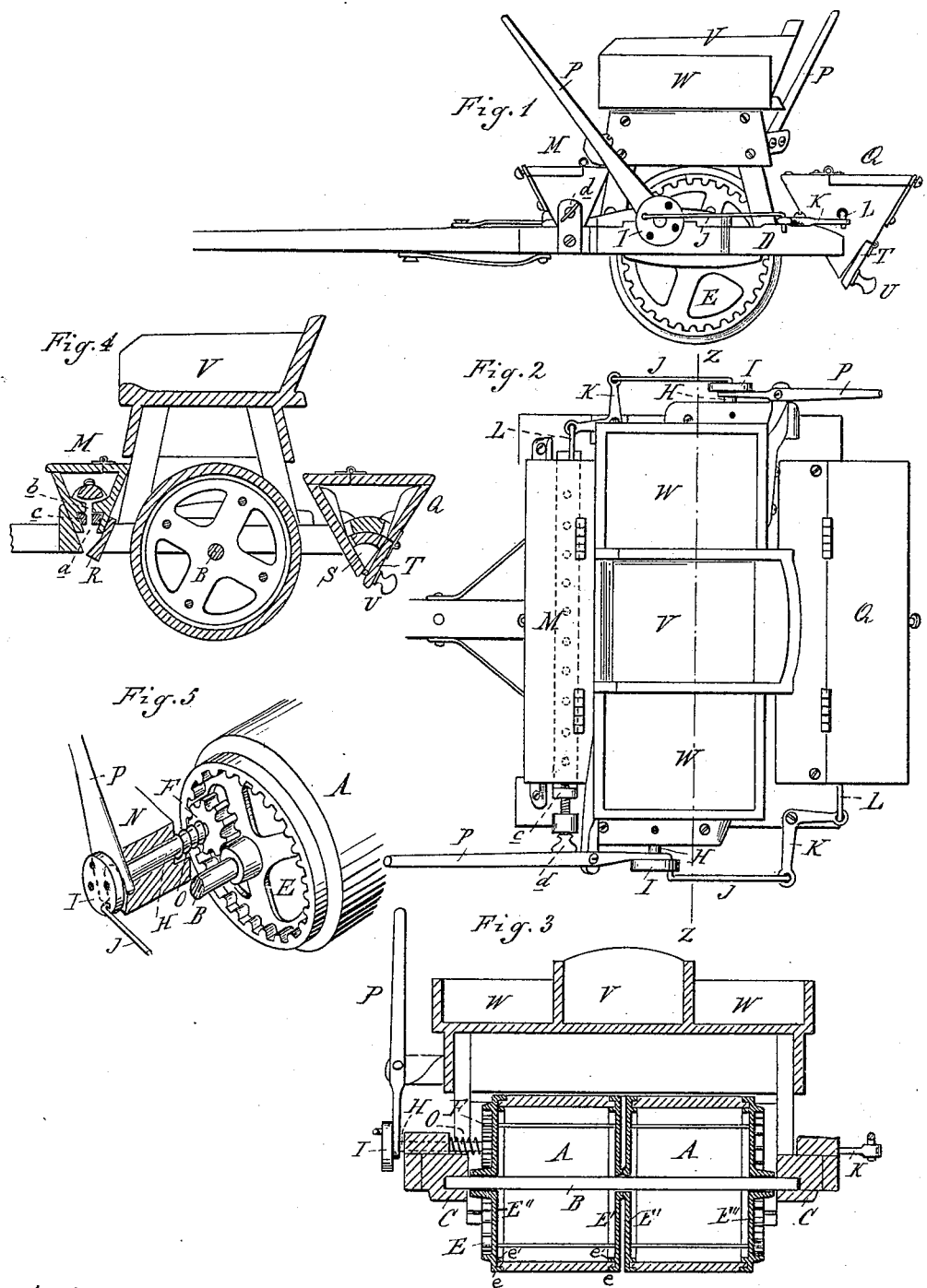

UNITED STATES PATENT OFFICE.

GEORGE G. LEE, OF PAW PAW, ASSIGNOR TO HIMSELF AND MYRON H. SMITH, OF LAWTON, MICHIGAN.

FIELD-ROLLER AND SEED AND PLASTER SOWER.

SPECIFICATION forming part of Letters Patent No. 249,957, dated November 22, 1881.

Application filed February 17, 1881. (No model.)

*To all whom it may concern:*

Be it known that I, GEORGE G. LEE, of Paw Paw, in the county of Van Buren and State of Michigan, have invented an Improvement in Field-Rollers and Seed and Plaster Sowers, of which the following is a specification.

The nature of this invention relates to certain new and useful improvements in that class of agricultural implements designed for sowing-seed broadcast, rolling the same into the ground, and distributing a top-dressing of any desired pulverized manure, similar to ground plaster or gypsum, and wherein the devices necessary to produce the desired results are combined in one machine.

The invention consists in the peculiar construction, combination, and operation of the various parts, as more fully hereinafter described.

Figure 1 is an end elevation, showing the arrangement of the operating parts with relation to each other. Fig. 2 is a top plan. Fig. 3 is a vertical section on the line $z\ z$ in Fig. 2. Fig. 4 is a central longitudinal vertical section. Fig. 5 is a detached perspective of one end of the roller, with attachments for giving motion to the sowers.

In the accompanying drawings, which form a part of this specification, A A represent the two halves of a sectional field-roller, both secured to a common shaft, B, which is journaled at its ends in suitable bearings, C, in or on the ends of the frame D. The outer ends of each of these rollers is provided with an internally-toothed wheel, E, by means of which and the pinion F, secured to the counter-shaft H, and the crank-wheel I, pitman J, bell-crank K, and rod L, the rotary motion of the rollers communicates a reciprocating motion to the distributing apparatus in the seed-box M, which is secured to the frame in front of the rollers. Each section of the roller consists of a cylinder of wood or metal, having its ends confined between internal flanges, $e\ e'$, of the heads E' E''. The outer head, E'', is provided with an external flange having internal teeth, and forms a gear-wheel for driving the pinion F. The gear-wheel so made is not liable to be clogged by earth gathering between its teeth, as would be the case with a wheel having external teeth.

The counter-shaft H is journaled in the box N, and a spring, O, is sleeved on the counter-shaft, between the pinion and the box N, to compel the engagement necessary between the pinion and the wheel E, except when forcibly disengaged by means of the lever P, which embraces the counter-shaft between the crank-wheel I and the box N, and is adapted to move the counter-shaft endwise in its box until the disengagement is effected.

As the devices for operating the distributing apparatus of the plaster-sower Q—which is secured to the frame in rear of the rollers— are precisely like those just described for operating the seeder, a further description is deemed unnecessary, and like letters will indicate like parts at each end of the machine.

The seeder M is internally provided with any of the known devices for distributing the seed and forcing it through the narrow aperture usually found in broadcast-seeders. Usually the seed passing through the aperture falls immediately to the ground, which in many cases is objectionable, especially in light seeds that are easily deviated by currents of wind. To remove this objection I provide an inclined shoe or board, R, which guides the seed which falls upon it more in a sheet form to the aperture, and in delivering the seed gives it a shoot forward, so that before the roller passes it will all have reached the ground.

The plaster-sower Q is internally provided with any suitable devices for discharging the fertilizer in a pulverized condition to the V-shaped chamber S, which is provided with a downwardly-opening door, T, and this in turn is provided with set-screws U, by means of which the size of the aperture at the bottom of the V-shaped chamber may be enlarged or diminished at will, as more or less of the fertilizer may be required.

V is a driver's seat, centrally located on top of the frame, and W are boxes on either side of the driver's seat, to be utilized for carrying bags of seed and plaster to replenish the sowers, or for other purposes.

Below the distributing apparatus of the seed-box M is a chamber, $a$, which is V-shaped, with the point of the V cut off. In the bottom of this chamber are a series of perforations, $b$, through which the seed passes to the aperture at the bottom of the shoe R. A slide, c, with a corresponding number of perforations, is adapted to close or disclose the perforations in the bottom, or partially so, at will. Said slide may be set at any desired point by means of the set-screw d, so that the amount of seed to be delivered may be regulated. An index may be attached, by means of which it may be known what quantity of seed is being delivered from the machine.

I am aware that it is not new to operate the seed-slide of seeders by means of gear-wheels, pitmen, bell-cranks, and rods; that rollers have been provided with metal heads having internal flanges, and therefore I make no broad claim to these features.

What I claim as my invention is—

In a combined roller and seeder, the sliding pinion F, sliding counter-shaft H, spiral spring O on said shaft, crank-wheel I, and lever P, having a forked lower end to embrace the shaft H, in combination with the head E, having internal flanges, e' e', for receiving the end of the rolling-cylinder, and provided with an outer flange with internal teeth to form a gear-wheel, and the pitman J, bell-crank K, and rod L, for giving motion to the seed-slides, substantially as and for the purpose described.

GEORGE G. LEE.

Witnesses:
H. S. SPRAGUE,
CHARLES J. HUNT.